(12) United States Patent
Sickon et al.

(10) Patent No.: US 8,613,470 B2
(45) Date of Patent: Dec. 24, 2013

(54) SEAT BELT SYSTEM WITH BUCKLE LATCH AND TENSION SENSOR

(75) Inventors: Richard P. Sickon, Rochester Hills, MI (US); Gary M. Sobek, Royal Oak, MI (US)

(73) Assignee: Delphi Technologies, Inc., Troy, MI (US)

( * ) Notice: Subject to any disclaimer, the term of this patent is extended or adjusted under 35 U.S.C. 154(b) by 12 days.

(21) Appl. No.: 13/396,138

(22) Filed: Feb. 14, 2012

(65) Prior Publication Data
US 2013/0207442 A1   Aug. 15, 2013

(51) Int. Cl.
*B60R 22/00* (2006.01)

(52) U.S. Cl.
USPC ............ 280/801.1; 324/207.11; 335/205

(58) Field of Classification Search
USPC ....... 280/801.1; 180/268; 24/633; 324/207.2, 324/207.24, 207.11; 335/205; 340/457.1; 73/862.391, 862.451, 862.392, 73/862.393
See application file for complete search history.

(56) References Cited

U.S. PATENT DOCUMENTS

| | | | |
|---|---|---|---|
| 5,960,523 A * | 10/1999 | Husby et al. | .......... 24/633 |
| 6,868,745 B2 | 3/2005 | Sullivan et al. | |
| 7,014,005 B2 | 3/2006 | Martinez et al. | |
| 7,383,744 B2 | 6/2008 | Frank | |

* cited by examiner

*Primary Examiner* — Keith Frisby
(74) *Attorney, Agent, or Firm* — Robert J. Myers (57) ABSTRACT

A seat belt system configured for use in a vehicle includes a seat belt buckle assembly that is configured to determine the both the latch condition of the seat belt buckle assembly with the seat belt tongue, and the tension applied to the seat belt webbing in a seat belt system. The seat belt buckle assembly includes a latch configured to receive and engage the seat belt tongue, a magnet, and a magnetic sensor configured to determine relative displacement of the magnet. The seat belt buckle assembly is configured to cause a first displacement between the magnet and the magnetic sensor in response to engagement of the seat belt tongue with the latch and cause a second displacement between the magnet and the magnetic sensor in response to tension on the seat belt webbing via the seat belt tongue. The first displacement is distinct from the second displacement.

16 Claims, 6 Drawing Sheets

SEAT BELT SYSTEM WITH BUCKLE LATCH AND TENSION SENSOR

TECHNICAL FIELD OF INVENTION

The invention generally relates to a seat belt system for vehicles, and more particularly relates to a seat belt system with an integral buckle latch and restraint tension sensor.

BACKGROUND OF INVENTION

It is known to provide a restraint system such as a seat belt system in a vehicle to restrain an occupant in a seat of the vehicle during a collision event. In some vehicles, the seat belt system may be a lap belt, a shoulder belt, or both. Typically, the lap belt and shoulder belt are connected together at one end. The seat belt system includes a tongue at the connected end. The seat belt system also includes a seat belt buckle connected at one end by seat belt webbing, a cable, or the like to vehicle structure. The buckle receives the tongue to be buckled together. When the buckle and tongue are buckled together, the seat belt system restrains movement of the occupant to help protect the occupant during a collision. Inflatable restraint systems, commonly referred to as "air bags", are typically used in combination with seat belt systems to enhance occupant protection in a collision event.

It is desirable to configure smart inflatable restraint systems to determine what is occupying a seat of the vehicle in order to control deployment of inflatable restraints. Various ways to determine seat belt tension and determine if the seat belt is fastened have been proposed to provide information to the inflatable restraint system. However, the previously proposed solutions may be large and/or complicated and so are difficult to locate in the preferred but limited space around the seat frame. The previous solutions were also expensive. Previously proposed solutions that use a separate seat belt latch sensor and seat belt tension sensor presents additional difficulties for vehicle interior designers.

SUMMARY OF THE INVENTION

In accordance with one embodiment of this invention, a seat belt buckle assembly is provided. The seat belt buckle assembly is configured for use in a vehicle seat belt system. The assembly includes a magnet and a magnetic sensor configured to determine displacement of the magnet relative to the magnetic sensor. The seat belt buckle assembly is configured to cause a first displacement in response to engagement of a seat belt tongue with the assembly and cause a second displacement in response to tension on a seat belt webbing. The second displacement is distinct from the first displacement.

In another embodiment of the present invention, the first displacement is substantially perpendicular to the second displacement.

In another embodiment of the present invention, the first displacement is a substantially lateral displacement relative to a north-south axis of the magnet and the second displacement is a substantially longitudinal displacement relative to the north-south axis.

In another embodiment of the present invention, the magnet is a single magnet.

In another embodiment of the present invention, the magnetic sensor is a single magnetic sensor.

In another embodiment of the present invention, the seat belt buckle assembly further includes a latch configured to receive and engage the seat belt tongue. The assembly further includes an actuator slidably coupled to the latch. The actuator is configured to cooperate with the latch to cause the first displacement in response to engagement of the seat belt tongue with the latch. The assembly also includes a slip plate slidably coupled to the latch. The slip plate is configured to cause the second displacement in response to tension of the seat belt webbing.

In another embodiment of the present invention, the seat belt buckle assembly further includes an arm. The arm is configured to cause the first displacement in a manner effective to place the magnet and the magnetic sensor within sufficient proximity such that a magnetic sensor output signal is greater than a latch detection threshold when the seat belt tongue is engaged with the latch. The arm is also configured to induce the first displacement to sufficiently separate the magnet and the magnetic sensor such that the magnetic sensor output signal is less than the latch detection threshold when the seat belt tongue is not engaged with the latch.

In another embodiment of the present invention, the seat belt buckle assembly further includes a slider configured to cooperate with the latch and the actuator to move the arm in a manner effective to cause the first displacement to place the magnet and the magnetic sensor in proximity. The assembly further includes a spring configured to urge the arm in a manner effective to cause the first displacement to separate the magnet and the magnetic sensor.

In another embodiment of the present invention, the spring is a torsion spring.

In another embodiment of the present invention, the arm is pivotally coupled to the latch.

In yet another embodiment of the present invention, a seat belt system is provided. The seat belt system is configured for use in a vehicle. The seat belt system includes seat belt webbing and a seat belt tongue attached to a first end of the seat belt webbing. The seat belt system further includes a latch configured to receive and engage the seat belt tongue and an anchor plate configured to be attached to a second end of the seat belt webbing and to be attached to the vehicle. The seat belt system also includes a magnet and a magnetic sensor that is configured to determine displacement of the magnet. The seat belt system is configured to cause a first displacement between the magnet and the magnetic sensor in response to engagement of a seat belt tongue with the assembly. The seat belt system is also configured to cause a second displacement between the magnet and the magnetic sensor in response to tension on the seat belt webbing via the seat belt tongue. The second displacement is distinct from the first displacement, wherein the seat belt tongue is attached to the seat belt webbing.

Further features and advantages of the invention will appear more clearly on a reading of the following detailed description of the preferred embodiment of the invention, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION OF INVENTION

It is desirable to sense latching of a buckle of a seat belt system of a vehicle. It is also desirable to sense tension in a seat belt of a seat belt system of a vehicle. It is further desirable to integrate the seat belt buckle, the buckle sensor, and the seat belt tension sensor into a single monolithic seat belt buckle assembly to simplify packaging and minimize the number of components required. Therefore, there is a need in the art for a seat belt and buckle tension sensing assembly that meets these desires. Prior seat belt buckle assemblies such as those shown by Sullivan et al. in U.S. Pat. No. 6,686,745 and Martinez et al. in U.S. Pat. No. 7,014,005 have required a plurality of magnets and magnetic sensors in order to determine the latch condition of the seat belt buckle assembly and the tension applied to the seat belt webbing in a seat belt system. The seat belt buckle assemblies and seat belt systems presented herein represent an improvement over the prior systems since they may be implemented using a single magnet and a single magnetic sensor.

Figure 1:
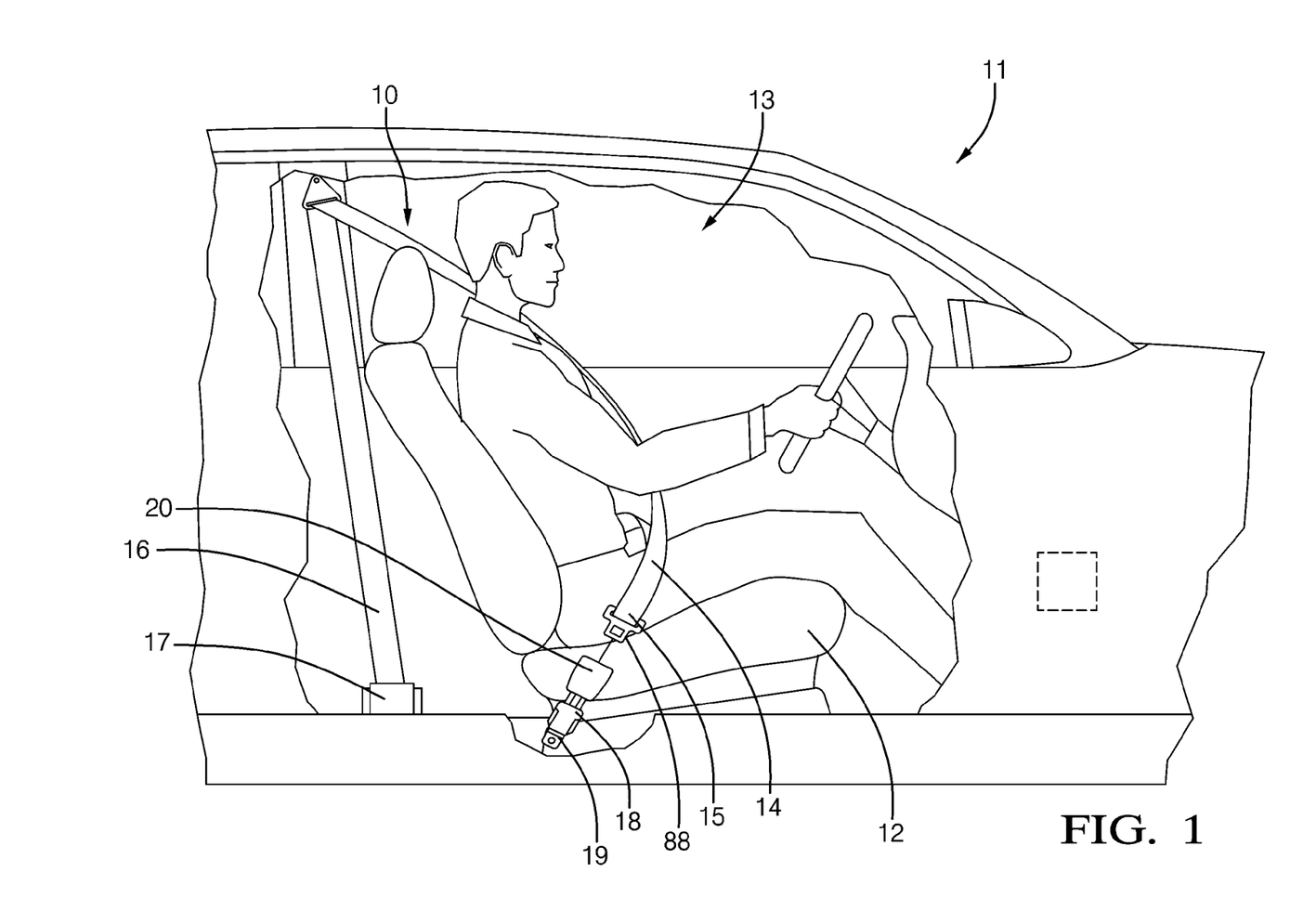
FIG. 1 is a cut away view of a vehicle including a seat belt buckle assembly, illustrated in operational relationship with a seat belt system in accordance with one embodiment.

FIG. 1 illustrates a non-limiting example of a seat belt system 10 configured for use in a vehicle 11 (partially shown). The vehicle 11 includes a seat 12 mounted by suitable means to a vehicle structure (not shown) such as a floor pan in an occupant compartment 13 of the vehicle 11. In FIG. 1, the seat 12 is a front seat of the vehicle 11. It should be appreciated that the seat 12 may be a rear seat, a second row seat, or a third row seat for the vehicle 11.

The seat belt system 10 includes seat belt webbing 14 and a seat belt tongue 88 attached to a first end 15 of the seat belt webbing 14 of a lap belt, shoulder belt, or both. A second end 16 of the seat belt webbing 14 may be attached to the vehicle structure or may be attached to a seat belt retractor 17 that may be secured to the vehicle structure. The seat belt system 10 also includes a seat belt buckle assembly 20 flexibly coupled by seat belt webbing 14, cable 18, or other suitable means to an anchor 19. The anchor 19 may be configured to be fixedly coupled to the vehicle structure. It should be appreciated that the seat belt tongue 88 is engageable and disengageable with the seat belt buckle assembly 20.

Figure 2:
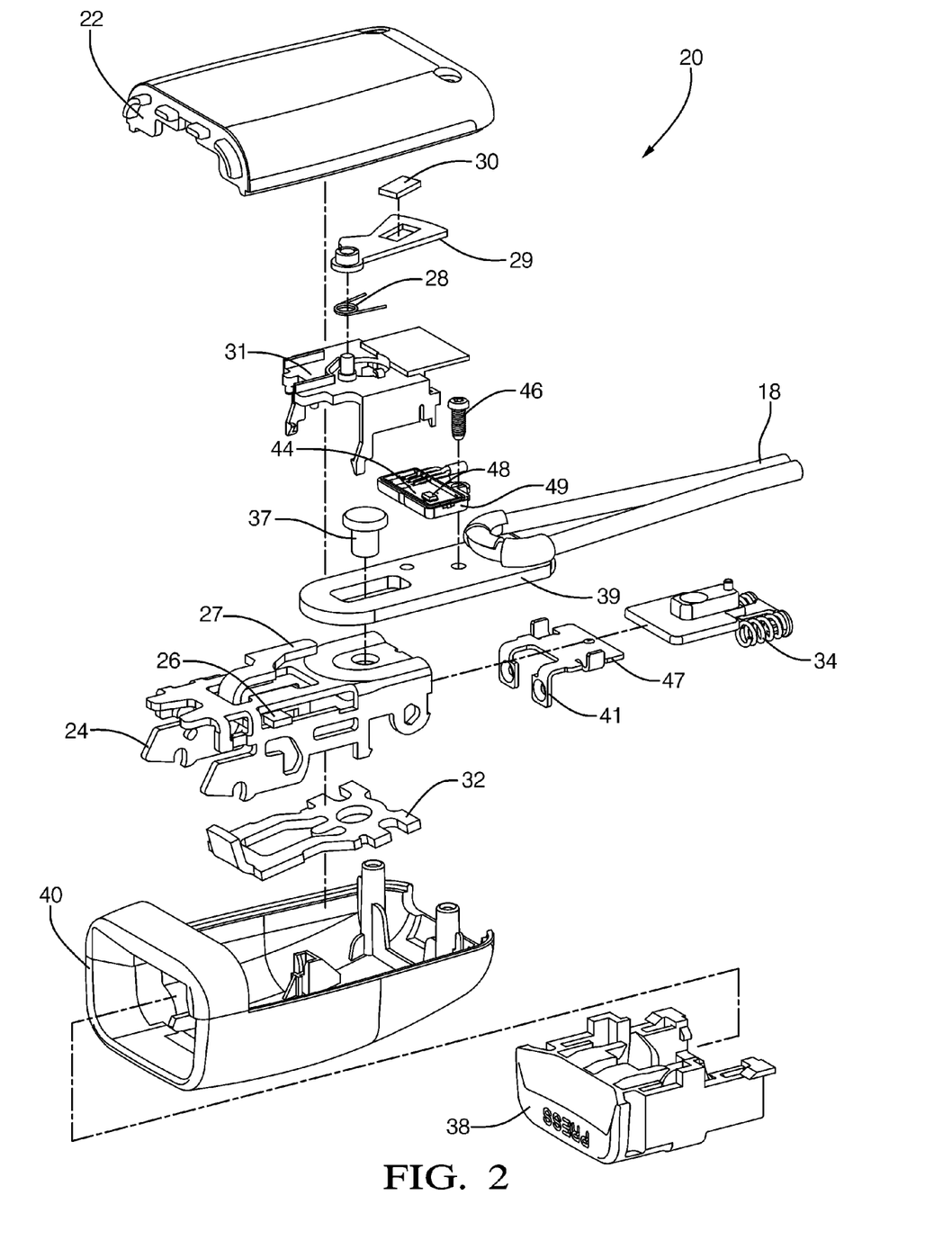
FIG. 2 is an exploded assembly view of the seat belt buckle assembly of FIG. 1 in accordance with one embodiment.

FIG. 2 illustrates the seat belt buckle assembly 20 including a bottom cover 22, a buckle frame 24, an actuator 26, a slider 27, a spring 28, a magnet 30, a magnetic sensor 48, a release button 38 and an upper cover 40. The bottom cover 22 and the upper cover 40 form a housing, which may be constructed out of a lightweight, easily molded material such as plastic. The magnetic sensor 48 is configured to determine a displacement of the magnet 30 relative to the magnetic sensor 48 due to a change in the magnetic field to which the magnetic sensor 48 is exposed. The magnet 30 is preferably capable of generating a magnetic field sufficient to cause a magnetic sensor output signal 75 to exceed a threshold. The magnet 30 is preferably bar shaped and may be made of ferrite, alnico, or other magnetic material. As a non-limiting example, the magnetic sensor 48 may be a Hall effect sensor, giant magnetoresistive (GMR) sensor, or anisotropic magnetoresistive (AMR) sensor. A magnetic sensor 48 output is preferably an analog output that varies proportionally with the strength of the magnetic field detected by the magnetic sensor 48. However, embodiments utilizing magnetic sensors with discrete or digital outputs are also envisioned.

The seat belt buckle assembly 20 shown in FIG. 2 includes an actuator 26 that may be slidably coupled to the buckle frame 24. According the illustrated embodiment, the slider 27 may be configured to cooperate with the actuator 26 and the latch 32 to cause the first displacement 90 (see FIGS. 4 and 5) in response to engagement of the seat belt tongue 88 with the latch 32. The seat belt system 10 also includes a buckle frame 24 that may be slideably coupled to the actuator 26 and may be configured to couple other components of the seat belt buckle assembly 20 to the actuator 26.

Figure 5:
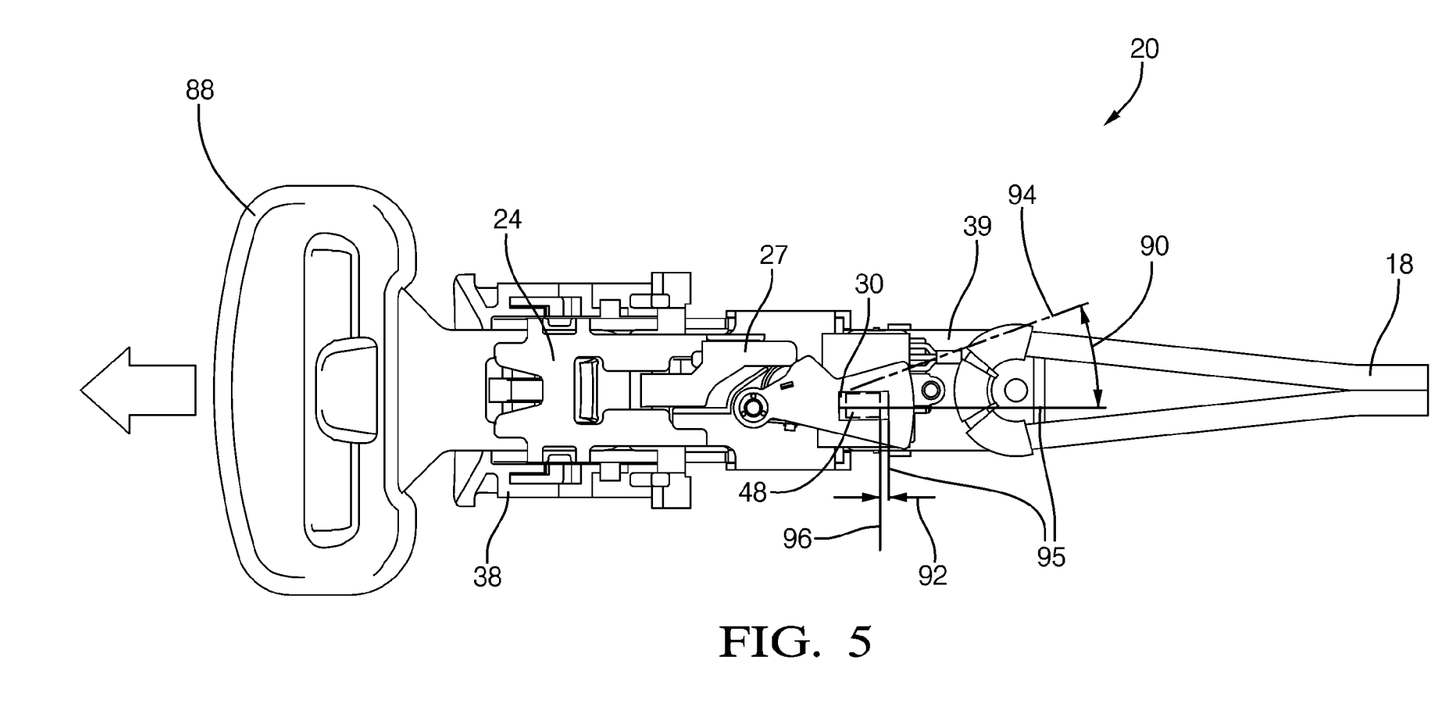
FIG. 5 is a bottom view of the seat belt buckle assembly of FIG. 1 in a second latched position with an amount of tension applied in accordance with one embodiment.

As shown in FIG. 5, the seat belt buckle assembly 20 is configured to cause a second displacement 92 between the magnet 30 and the magnetic sensor 48 in response to tension on the seat belt webbing 14 via the seat belt tongue 88 which is attached to the first end 15 of the seat belt webbing 14. The second displacement 92 is distinct from the first displacement 90. The first displacement 90 is substantially perpendicular to the second displacement 92. As used herein, a substantially perpendicular displacement refers to a major axis of motion of the first displacement 90 that is ±30° to perpendicular with a major axis of motion of the second displacement 92. The second displacement 92 may be a substantially longitudinal displacement relative to the north-south axis. In the non-limiting example shown in FIG. 5, the arm 29 provides a radial first displacement 90 of the magnet 30 from the first position 94 to the second position 95. This radial first displacement 90 is substantially perpendicular to the second displacement 92 in the vicinity of the magnetic sensor 48.

Returning to FIG. 2, the seat belt buckle assembly 20 includes a holder 49 configured to receive a printed circuit board (PCB) 44. PCB 44 includes the magnetic sensor 48 configured to determine a displacement of the magnet 30 relative to the magnetic sensor 48 due to a change in the magnetic field to which the magnetic sensor 48 is exposed. The holder 49 may be fixedly coupled to the slip plate 39 via a fastener 46 that may be a screw, rivet, or other suitable attachment means.

Figure 4:
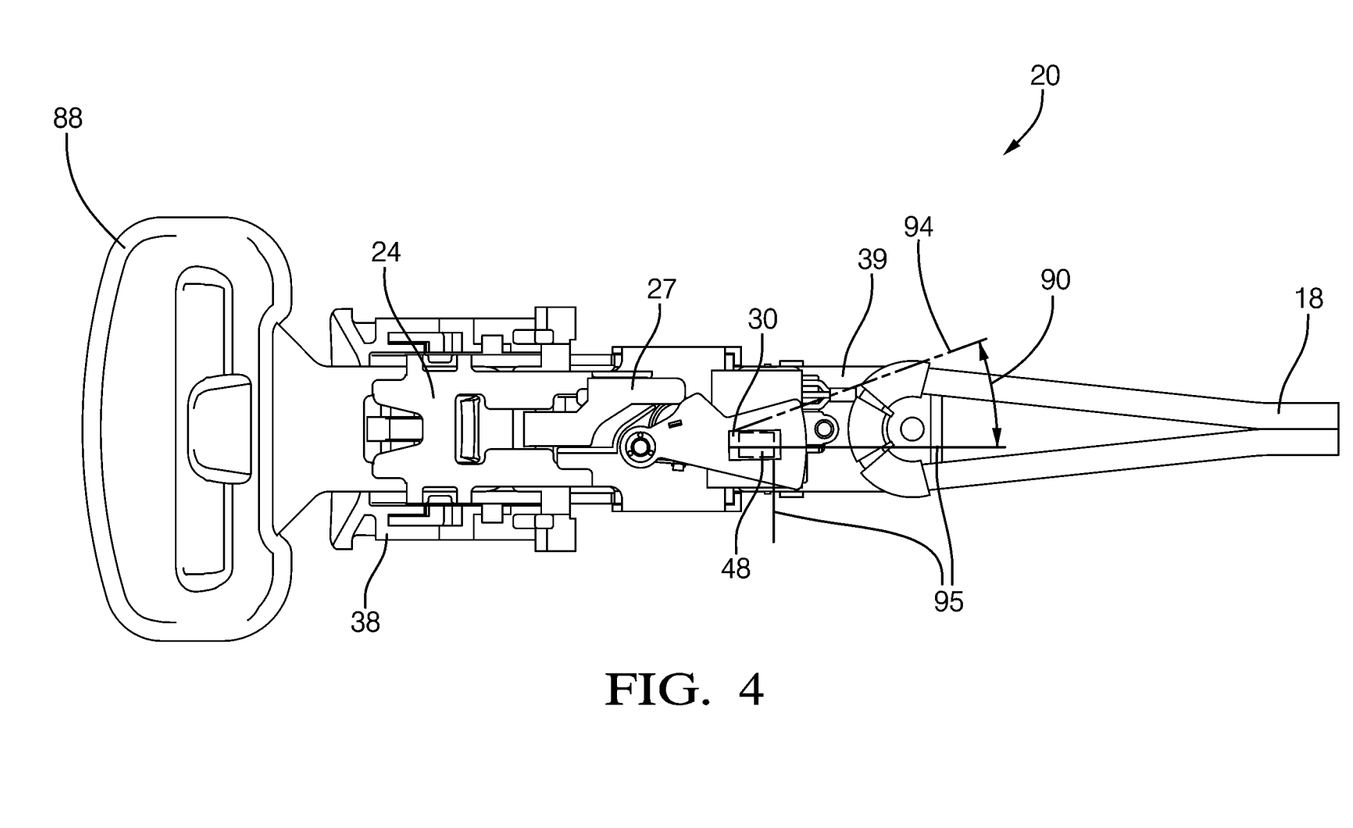
FIG. 4 is a bottom view of the seat belt buckle assembly of FIG. 1 in a first latched position with no tension applied in accordance with one embodiment.

The seat belt buckle assembly 20 further includes a slip plate 39 slidably coupled to the buckle frame 24 via a fastener 37. The fastener 37 may be a screw, rivet, or other suitable attachment means. The seat belt buckle assembly 20 also includes biasing spring 34 configured to provide a biasing force and are held into place by a tab 41 of retainer 47 that may be fixedly coupled to the slip plate 39. The buckle frame 24 may be configured to cause the second displacement 92 in response to tension of the seat belt webbing 14 such that a magnetic sensor output signal 75 varies proportionally to the seat belt tension when the seat belt tongue 88 is engaged with the seat belt buckle assembly 20. Biasing spring 34 provides the urging force that the buckle frame 24 must overcome for the second displacement 92 in order to move from a second position 95 to a third position 96, as shown in FIGS. 4 and 5.

Figure 6:
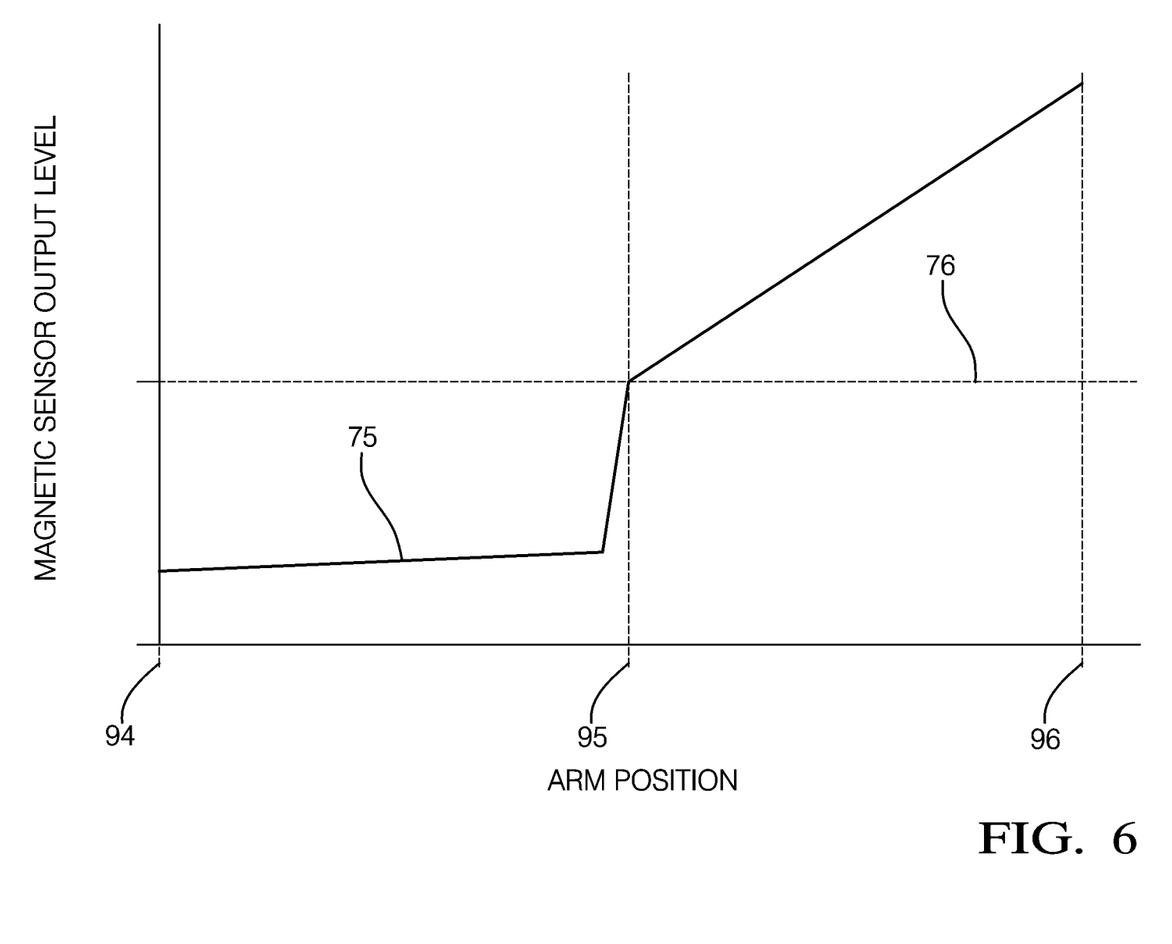
FIG. 6 is a graph showing a comparison of an analog magnetic sensor output signal and an actuator/arm position in accordance with one embodiment.

Referring again to FIG. 2, the seat belt buckle assembly 20 includes a slider 27 coupled to the actuator 26 and an arm 29. According to this non-limiting example, the slider 27 may be slidably coupled to a base 31 and may be fixedly coupled to the actuator 26. The magnet 30 may be fixedly coupled to the arm 29. The magnet 30 may be disposed on the top surface, bottom surface, or in a cavity defined by the arm 29. The arm 29 may be preferably constructed of a material having a high magnetic permeability, such as plastic. The arm 29 may be pivotably coupled to the base 31 by a screw, rivet, pin, or other suitable attachment means. The base 31 may be fixedly coupled to the buckle frame 24. The base 31 may be preferably constructed of a material having a high magnetic permeability, such as plastic. The slider 27 may be configured to contact the arm 29 in a position offset from the pivot when the seat belt tongue 88 is engaged with the seat belt buckle assembly 20. An offset force generated by the contact of the slider 27 with the arm 29 causes the arm 29 to pivot in a manner effective to cause the first displacement 90 and place the magnet 30 and the magnetic sensor 48 within sufficient proximity such that a magnetic sensor output signal 75 is greater than a latch detection threshold 76 as shown in FIG. 6.

Figure 3:
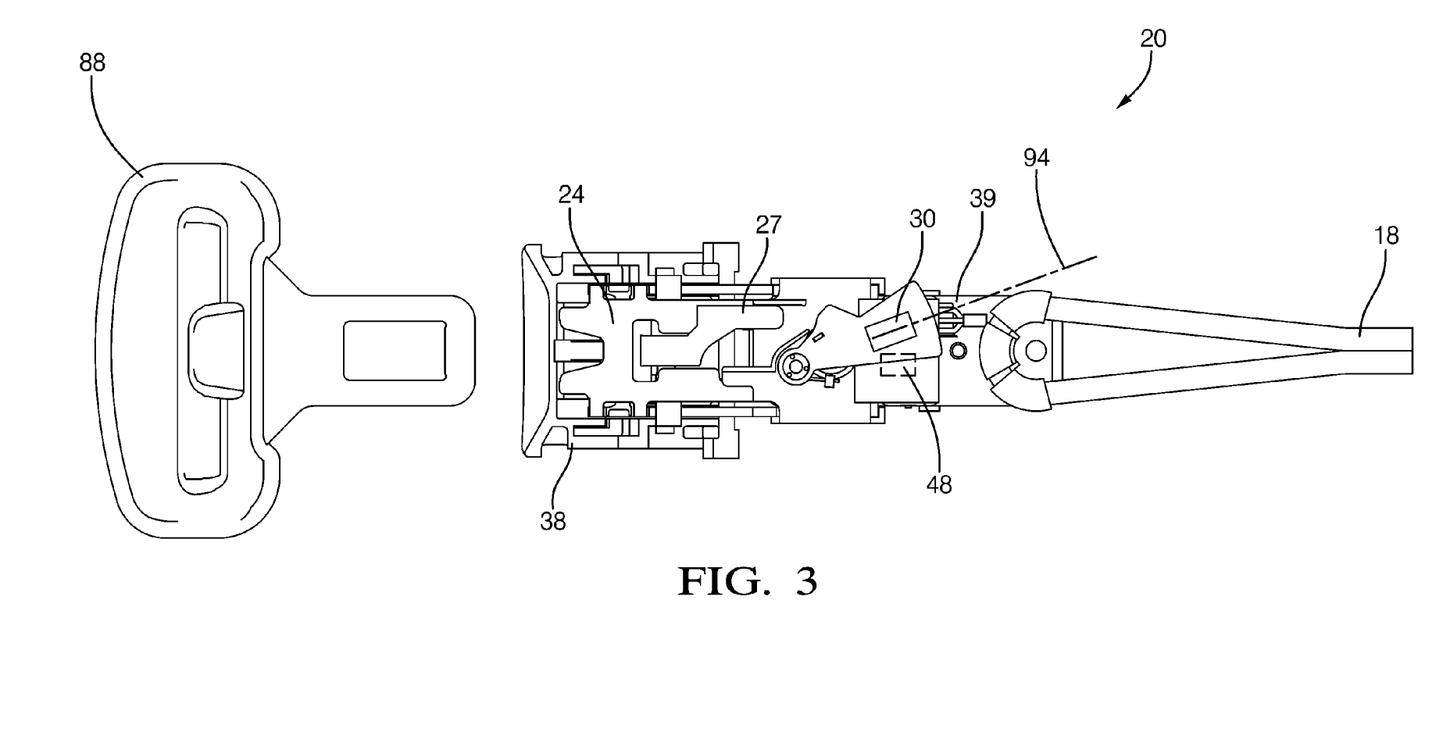
FIG. 3 is a bottom view of the seat belt buckle assembly of FIG. 1 in the unlatched position in accordance with one embodiment.

The actuator 26 will cause the slider 27 to disengage the arm 29 when the seat belt tongue 88 is disengaged from the seat belt buckle assembly 20. The seat belt buckle assembly 20 may include a spring 28 configured to urge the arm 29 and hence the magnet 30 to the first location thereby separating the magnet 30 and the magnetic sensor 48 such that the magnetic sensor output signal 75 is less than the latch detection threshold 76 when the seat belt tongue 88 is not engaged with the latch 32 as shown in FIG. 3. The spring 28 is preferably a torsion spring 28 coupling the arm 29 to the base 31, although other embodiments utilizing a compression or extension spring may be envisioned by those having ordinary skill in the art.

Referring now to FIG. 3, when seat belt tongue 88 is on the outside of the seat belt buckle assembly 20, the slider 27 is not in contact with the arm 29 allowing the arm 29 accommodating the magnet 30, to be urged into the first position 94 through spring 28. When the arm 29 is at the first position 94, magnet 30 is located away from magnetic sensor 48 of PCB 44. The magnetic sensor 48 is capable of reading the magnet 30 field created by magnet 30 or more accurately, sensing an absence of a magnetic field from the magnet 30 and the magnetic sensor output signal 75 is below a latch detection threshold 76.

Referring now to FIG. 4, illustrating the seat belt buckle assembly 20 in the latched position, with zero tension. When seat belt tongue 88 is inside seat belt buckle assembly 20. The latched position causes the actuator 26 to move the slider 27 be in contact with the arm 29 and the offset force exerted on the arm 29 by the slide causes the arm 29 to pivot about the pin until the arm 29 and causing a first displacement 90 that moves the arm 29 from the first position 94 to a second and specifically the magnet 30 attached thereto, to be in proximity to the magnetic sensor 48. The first displacement 90 is arbitrarily selected for purposes of illustration to place a pole of magnet 30 at a certain distance from the front edge of magnetic sensor 48. This distance registers a certain magnetic field strength whereby magnetic sensor 48 produces the magnetic sensor output signal 75 accordingly.

Referring now to FIG. 5, illustrating the seat belt buckle assembly 20 in the latched position and showing how changes in a seat belt tension level translate into a second displacement 92. The second displacement 92 moves the magnet 30 from the second position 95 to the third position 96, which in turn changes the position of the magnetic sensor 48 in the magnetic field created by magnet 30. Resulting changes in the detected field strength by the magnetic sensor 48 will vary the magnetic sensor output signal 75.

FIG. 5 shows a condition wherein tension is applied to the seat belt (not shown). The seat belt tongue 88 moves in the direction of the arrow thereby creating a force necessary to generate a second displacement 92 that moves the arm 29, and hence the magnet 30, from the second position 95 toward a third position 96 relative to the magnetic sensor 48. The second displacement 92 places the magnet 30, residing on the arm 29 in the third position 96, at a certain distance from the front edge of magnetic sensor 48. This second displacement 92 corresponds to a certain tension applied via seat belt tongue 88. The relative positions of magnetic sensor 48 and magnet 30 register a certain magnetic field strength whereby magnetic sensor 48 produces an output signal that corresponds to the intensity of the magnetic field created by the location of magnet 30. As shown in FIG. 6, the magnetic sensor output signal 75 may increase from the latch detection threshold 76 output level proportional to seat belt tension applied to the seat belt tongue 88 as the seat belt tension causes the magnet 30 to move from the second position 95 to the third position 96.

Accordingly, a seat belt system 10 and a seat belt buckle assembly 20 for the seat belt system 10 is provided. As shown in the preceding embodiments of the seat belt buckle assembly 20, a single magnet 30 and a single magnetic sensor 48 may be used to determine both the latch condition of the seat belt buckle assembly 20 with the seat belt tongue 88 and the tension applied to the seat belt webbing 14 in a seat belt system 10.

While this invention has been described in terms of the preferred embodiments thereof, it is not intended to be so limited, but rather only to the extent set forth in the claims that follow. Moreover, the use of the terms first, second, etc. does not denote any order of importance, but rather the terms first, second, etc. are used to distinguish one element from another. Furthermore, the use of the terms a, an, etc. do not denote a limitation of quantity, but rather denote the presence of at least one of the referenced items.

We claim:

1. A seat belt buckle assembly configured for use in a vehicle seat belt system, wherein the assembly comprises:
   a magnet;
   a magnetic sensor configured to determine displacement of the magnet relative to the magnetic sensor, wherein the seat belt buckle assembly is configured to cause a first displacement in response to engagement of a seat belt tongue with the assembly and cause a second displacement in response to tension on a seat belt webbing, wherein the second displacement is distinct from the first displacement;
   a latch configured to receive and engage the seat belt tongue;
   an actuator slidably coupled to the latch, wherein the actuator is configured to cooperate with the latch to cause the first displacement in response to engagement of the seat belt tongue with the latch;
   a slip plate slidably coupled to the latch, wherein the slip plate is configured to cause the second displacement in response to tension of the seat belt webbing; and
   an arm, wherein the arm is configured to cause the first displacement in a manner effective to place the magnet and the magnetic sensor within sufficient proximity such that a magnetic sensor output signal is greater than a latch detection threshold when the seat belt tongue is engaged with the latch and induce the first displacement to sufficiently separate the magnet and the magnetic sensor such that the magnetic sensor output signal is less than the latch detection threshold when the seat belt tongue is not engaged with the latch.

2. The assembly of claim 1, wherein the first displacement is substantially perpendicular to the second displacement.

3. The assembly of claim 2, wherein the first displacement is a substantially lateral displacement relative to a north-south axis of the magnet and the second displacement is a substantially longitudinal displacement relative to the north-south axis.

4. The assembly of claim 1, wherein the magnet is a single magnet.

5. The assembly of claim 1, wherein the magnetic sensor is a single magnetic sensor.

6. The assembly of claim 1, said assembly further comprising:
   a slider configured to cooperate with the latch and the actuator to move the arm in a manner effective to cause the first displacement to place the magnet and the magnetic sensor in proximity; and
   a spring configured to urge the arm in a manner effective to cause the first displacement to separate the magnet and the magnetic sensor.

7. The assembly of claim 6, wherein the spring is a torsion spring.

8. The assembly of claim 1, wherein the arm is pivotally coupled to the latch.

9. The assembly of claim 1, wherein the slip plate is configured to cause the second displacement such that a magnetic sensor output signal is greater than a latch detection threshold when the seat belt tongue is engaged with the latch and the magnetic sensor output signal is proportional to a seat belt tension.

10. A seat belt system configured for use in a vehicle, wherein the seat belt system comprises:
    seat belt webbing;
    a seat belt tongue attached to a first end of the seat belt webbing;
    a latch configured to receive and engage the seat belt tongue;
    a magnet; and
    a magnetic sensor configured to determine displacement of the magnet, wherein the seat belt system is configured to cause a first displacement between the magnet and the magnetic sensor in response to engagement of the seat belt tongue with the latch and cause a second displacement between the magnet and the magnetic sensor in response to tension on the seat belt webbing via the seat belt tongue, wherein the second displacement is distinct from the first displacement;
    an actuator slidably coupled to the latch, wherein the actuator is configured to cooperate with the latch to cause the first displacement in response to engagement of the seat belt tongue with the latch;
    a slip plate slidably coupled to the latch and fixedly attached to the vehicle, wherein the slip plate is configured to cause the second displacement in response to tension of the seat belt webbing; and
    an arm, wherein the arm is configured to cause the first displacement in a manner effective to place the magnet and the magnetic sensor within sufficient proximity such that a magnetic sensor output signal is greater than a latch detection threshold when the seat belt tongue is engaged with the latch and induce the first displacement to sufficiently separate the magnet and the magnetic sensor such that the magnetic sensor output signal is less than the latch detection threshold when the seat belt tongue is not engaged with the latch.

11. The assembly of claim 10, wherein the first displacement is substantially perpendicular to the second displacement.

12. The system of claim 11, wherein the first displacement is a substantially lateral displacement relative to a north-south axis of the magnet and the second displacement is a substantially longitudinal displacement relative to the north-south axis.

13. The assembly of claim 10, wherein the magnet is a single magnet.

14. The assembly of claim 10, wherein the magnetic sensor is a single magnetic sensor.

15. The system of claim 10, said system further comprising:
    a slider configured to cooperate with the latch and the actuator to move the arm in a manner effective to cause the first displacement to place the magnet and the magnetic sensor in proximity; and
    a spring configured to urge the arm in a manner effective to cause the first displacement to separate the magnet and the magnetic sensor.

16. The system of claim 10, wherein the slip plate is configured to cause the second displacement such that a magnetic sensor output signal is greater than a latch detection threshold when the seat belt tongue is engaged with the latch and the magnetic sensor output signal is proportional to a seat belt tension.

* * * * *